United States Patent
Doar et al.

(10) Patent No.: US 9,961,744 B1
(45) Date of Patent: *May 1, 2018

(54) AMBIENT LIGHT SENSING FOR DISPLAY

(71) Applicant: Amazon Technologies, Inc., Seattle, WA (US)

(72) Inventors: Jeffrey B. Doar, Fremont, CA (US); James Samuel Bowen, Cupertino, CA (US); Robert W. Zehner, Los Gatos, CA (US); Allen Lee, Los Altos, CA (US)

(73) Assignee: Amazon Technologies, Inc., Reno, NV (US)

( * ) Notice: Subject to any disclaimer, the term of this patent is extended or adjusted under 35 U.S.C. 154(b) by 418 days.

This patent is subject to a terminal disclaimer.

(21) Appl. No.: 14/560,720

(22) Filed: Dec. 4, 2014

Related U.S. Application Data (63) Continuation of application No. 13/533,664, filed on Jun. 26, 2012, now Pat. No. 8,933,916.

(51) Int. Cl.
| | |
|---|---|
| *G09G 5/00* | (2006.01) |
| *H05B 37/02* | (2006.01) |
| *F21V 8/00* | (2006.01) |
| *G09G 3/34* | (2006.01) |

(52) U.S. Cl.
CPC ....... *H05B 37/0218* (2013.01); *G02B 6/0068* (2013.01); *G09G 3/344* (2013.01); *G09G 3/3406* (2013.01); *G09G 2320/0666* (2013.01); *G09G 2360/144* (2013.01); *G09G 2380/14* (2013.01)

(58) Field of Classification Search
CPC .... G09G 3/344; G09G 3/3406; G09G 3/3413; G09G 3/3433; G09G 2320/0626; G09G 2360/144

USPC .................................. 345/76–83, 204–215
See application file for complete search history.

(56) References Cited

U.S. PATENT DOCUMENTS

| | | | |
|---|---|---|---|
| 5,907,222 A | 5/1999 | Lengyel et al. | |
| 6,215,920 B1 | 4/2001 | Whitehead et al. | |
| 7,352,930 B2 | 4/2008 | Lowles | |
| 7,859,617 B2 | 12/2010 | Kleverman et al. | |
| 8,096,695 B2 | 1/2012 | Ong | |
| 8,933,916 B1 * | 1/2015 | Doar | G09G 3/3406 345/207 |
| 9,348,082 B2 * | 5/2016 | Atkins | G02B 6/0036 |
| 9,483,981 B2 * | 11/2016 | Letourneur | G09G 3/34 |
| 2002/0050974 A1 | 5/2002 | Rai et al. | |
| 2005/0108642 A1 | 5/2005 | Sinclair | |
| 2005/0151716 A1 | 7/2005 | Lin | |
| 2008/0248837 A1 | 10/2008 | Kunkel | |

(Continued)

OTHER PUBLICATIONS

International Search Report and Written Opinion for International Application No. PCT/US13/47092 mailed Oct. 31, 2013 (9 pgs.).

*Primary Examiner* — Vijay Shankar
(74) *Attorney, Agent, or Firm* — Eversheds Sutherland (US) LLP (57) ABSTRACT

Devices such as electronic book readers, televisions, and so forth may use reflective display technologies. Described herein are devices and methods for ambient light sensing for use in conjunction with displays. A light guide panel is coupled to a light sensor to measure ambient light impinging on the light guide panel. Where the display is reflective, the light guide panel may be configured to provide for illumination of the display.

17 Claims, 11 Drawing Sheets

(56) References Cited

U.S. PATENT DOCUMENTS

| | | |
|---|---|---|
| 2009/0027921 A1 | 1/2009 | Chou et al. |
| 2009/0096745 A1 | 4/2009 | Sprague et al. |
| 2009/0115763 A1 | 5/2009 | Inoue |
| 2010/0149145 A1 | 6/2010 | Van Woudenberg et al. |
| 2011/0001764 A1 | 1/2011 | Rhodes |
| 2011/0074803 A1 | 3/2011 | Kerofsky |
| 2011/0157108 A1 | 6/2011 | Ishii |
| 2011/0199671 A1 | 8/2011 | Amundson et al. |
| 2011/0205397 A1 | 8/2011 | Hahn et al. |
| 2012/0019152 A1 | 1/2012 | Barnhoefer et al. |
| 2012/0019492 A1 | 1/2012 | Barnhoefer et al. |
| 2012/0046947 A1 | 2/2012 | Fleizach |
| 2012/0127198 A1 | 5/2012 | Gundavarapu |
| 2012/0182276 A1 | 7/2012 | Kee |
| 2013/0048837 A1 | 2/2013 | Pope et al. |
| 2013/0161489 A1 | 6/2013 | Gardner |
| 2013/0334972 A1* | 12/2013 | Atkins ............... G02B 6/0036 315/151 |
| 2014/0002428 A1* | 1/2014 | Letourneur ............ G09G 3/34 345/207 |

\* cited by examiner

AMBIENT LIGHT SENSING FOR DISPLAY

RELATED APPLICATION

This patent application is a continuation of U.S. patent application Ser. No. 13/533,664, titled "AMBIENT LIGHT SENSING FOR DISPLAY," filed on Jun. 26, 2012, which is hereby incorporated by reference in its entirety.

BACKGROUND

A variety of devices, such as electronic book ("e-Book") reader devices, desktop computers, portable computers, smartphones, tablet computers, game consoles, televisions, and so forth are used to access various forms of content. Ambient light sensors may be used to gather information about ambient light levels. Current ambient light sensors may be inadvertently occluded during use, or may result in a chassis with one or more penetrations.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

A variety of devices, such as electronic book ("e-Book") reader devices, desktop computers, portable computers, smartphones, tablet computers, televisions, and so forth are used to access various forms of content and other information. These displays may be emissive, reflective, or a combination thereof. An emissive display emits light to form an image. Emissive displays include, but are not limited to, backlit liquid crystal displays, plasma displays, cathode ray tubes, light-emitting diodes, image projectors, and so forth. Reflective displays use incident light to form an image. This incident light may be provided by the sun, general illumination in the room, a reading light, a front light, and so forth. Reflective displays include, but are not limited to, electrophoretic displays, interferometric displays, electrowetting, cholesteric displays, and so forth.

Where an illumination source is used, such as in a backlit liquid crystal display ("LCD") or a frontlit electrophoretic display ("EPD"), an intensity of the illumination may be varied based at least in part on the ambient light. For example, in sunlight, a backlight on an LCD may be increased while a frontlight on an EPD may be decreased in the same conditions. Ambient light sensors may be used to provide information about the intensity of the ambient light which is used to vary the illumination level.

Traditional ambient light sensors may utilize a hole or aperture in a chassis to acquire ambient light. These apertures introduce complexity and limitations in the design and manufacture of devices, as well as introducing a weak point in the chassis or a point for intrusion of contaminants such as water or dust. For example, when a chassis or case of the device is white or another light color, the aperture may appear as a black speck or apparent imperfection. Furthermore, the apertures for the ambient light sensors may be inadvertently occluded by a user's hands, protective covers, and so forth. As a result of this occlusion, the ambient light sensor in these traditional designs may not accurately reflect true ambient light conditions.

Described in this disclosure are devices and methods for an ambient light sensor coupled to a light guide panel. The light guide panel comprises one or more materials configured to direct light along a planar surface. In some implementations, the light guide panel may be used to frontlight a reflective display by directing at least a portion of light from one or more illuminators onto a portion of the reflective display. The ambient light sensor is arranged within the chassis of the device, and at least a portion of ambient light which impinges on the light guide panel is communicated to the ambient light sensor.

With the configuration described herein, the light guide panel acts to collect ambient light from a significantly larger area than the traditional aperture. As a result, measurement of the actual ambient light level is improved by reducing the likelihood or severity of occlusion by the user or an accessory. Furthermore, no penetrations for the ambient light sensor are required, improving the functionality and aesthetics of the chassis.

Illustrative Devices

Figure 1:
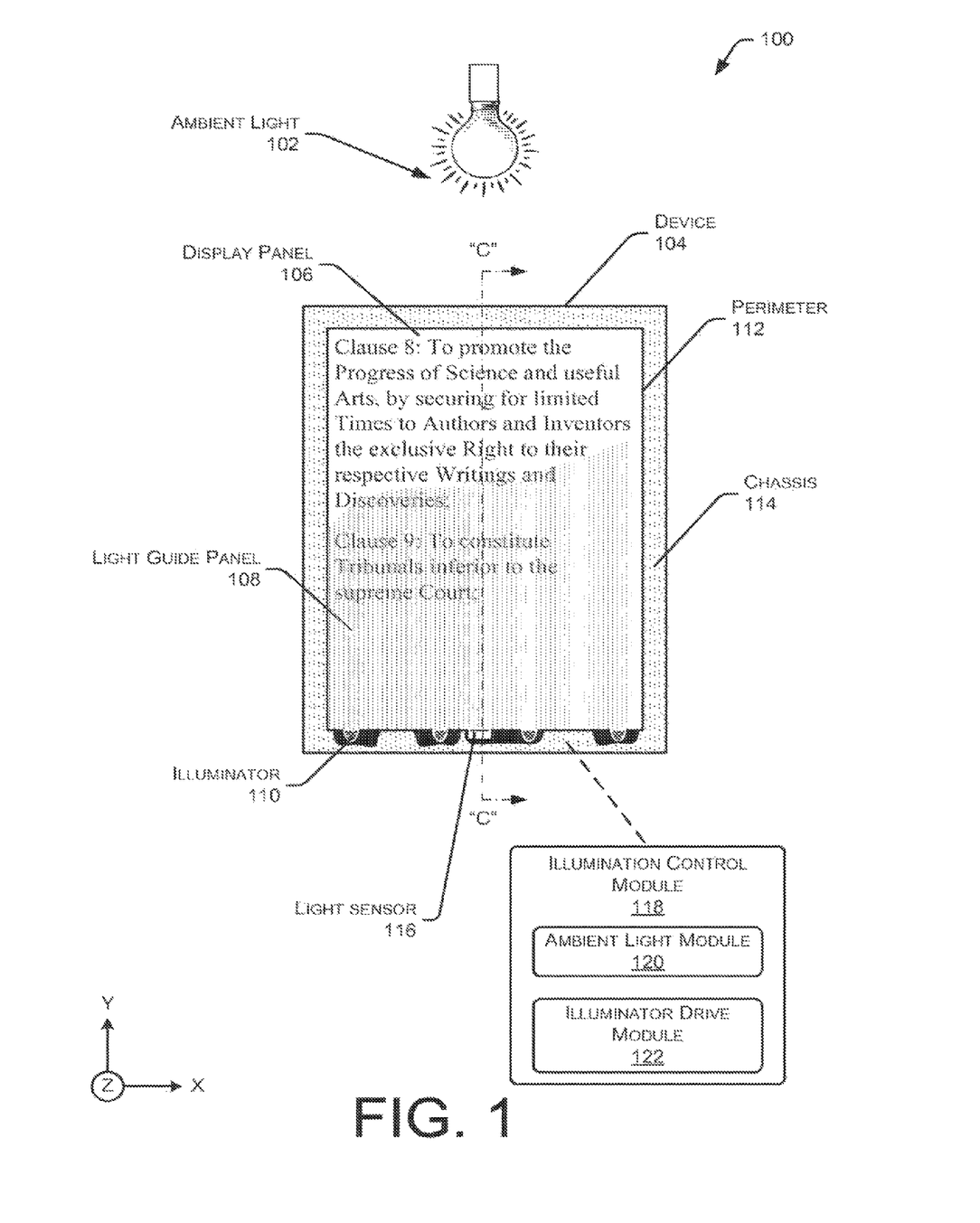
FIG. 1 illustrates a device (not to scale) comprising a display with a light guide panel and a light sensor coupled to the light guide panel and configured to measure ambient light in accordance with an embodiment of the disclosure.

FIG. 1 illustrates an environment 100 which may include ambient light 102 and a device 104. The device 104 may comprise an electronic book ("e-Book") reader device, a computer display, a portable computer, a smartphone, a tablet computer, a game console, a television, an in-vehicle display, and so forth. For clarity of illustration, the figures in this disclosure are not depicted to scale. For ease of description, three axes orthogonal to one another are shown, designated as X, Y, and Z.

The ambient light 102, when present, may be provided by artificial lighting such as a light bulb, by natural lighting such as the sun, or a combination. The ambient light 102 may be provided by a point source such as the sun or other highly localized source, or a diffuse source such as a cloudy sky. The ambient light may comprise photons in infrared wavelengths, visible wavelengths, ultraviolet wavelengths, or a combination thereof.

The ambient light 102 may impinge on at least a portion of the device 104. The device 104 may comprise one or more displays which may be configured to present visual information to a user. The one or more displays may be emissive or reflective. An emissive display emits light to form an image. Emissive displays include, but are not limited to, backlit liquid crystal displays, plasma displays, cathode ray tubes, light-emitting diodes, image projectors, and so forth. Reflective displays use incident light to form an image. This incident light may be provided by the sun, general illumination in the room, a reading light, a frontlight, and so forth. Reflective displays include electro-optical displays such as electrophoretic displays, cholesteric displays, electrowetting, and so forth, as well as interferometric and other displays. For example, the electrophoretic displays may comprise an electrophoretic material configured such that when electricity is applied an image may be formed. The display may be configured to present images in monochrome, color, or both. In some implementations, the display may use emissive, reflective, or combination displays with emissive and reflective elements.

In the implementation shown here, the display comprises a display panel 106. This display panel 106 may comprise a reflective display such as an EPD, or in some implementations may comprise an emissive display. For ease of discussion, and not by way of limitation, in this disclosure, "front" indicates a side which may be proximate to a user during typical use of the device 104, while the "back" indicates a side opposite the front which is distal to the user during typical use, along the Z axis depicted here.

Arranged in front of the display panel 106 is a light guide panel 108. The light guide panel 108 is substantially planar and may comprise one or more materials such as plastic, glass, aerogel, metal, ceramic, and so forth. The light guide panel 108 may be configured with one or more features on the surface thereof, or embedded within, which are configured to direct light along pre-determined paths. These features may be diffractive, refractive, reflective, and so forth. In some implementations where the display panel 106 comprises a reflective display, the light guide panel 108 may be configured to distribute at least a portion of light emitted from one or more illuminators 110 to a front side of the display panel 106. The light guide panel 108 may be laminated to the display panel 106. In some implementations the illuminators 110 may be configured to provide backlighting to the display panel 106. The illuminators 110 are shown here in a cutaway view of the interior of the chassis 114 to provide front lighting to the display panel 106.

The one or more illuminators 110 are configured to emit light when activated. The light emitted may comprise photons in infrared wavelengths, visible wavelengths, ultraviolet wavelengths, or a combination thereof. Each illuminator 110 may comprise one or more light-emitting diodes ("LED"), cold cathode fluorescent lamp ("CCFL"), electroluminescent materials, sonoluminescent materials, fluorescent lights, incandescent lights, or a combination thereof. In some implementations, different types of illuminators 110 may be used in the same device 104. For example, electroluminescent lights may be used in conjunction with LEDs. The one or more illuminators 110 may be arranged along one or more edges of a perimeter 112 of the light guide panel 108. The one or more illuminators 110 are adjacent to and may be optically coupled to the light guide panel 108 such that light emitted from the one or more illuminators 110 is distributed to at least a portion of the display panel 106.

The optical coupling between the light guide panel 108 and the one or more illuminators 110 may comprise one or more of physical proximity, an air gap, an adhesive, a mechanical interface, and so forth. In some implementations, one or more surface features may be provided on the light guide panel 108, the illuminator 110, or both. These surface features, such as diffusers, grooves, grating, dimples, lenses, planar surfaces, concave surfaces, convex surfaces, and so forth, may be used to enhance or attenuate the transmission of light between the one or more illuminators 110 and the light guide panel 108. In some implementations, these surface features may be separate or discrete elements which have been coupled to the light guide panel 108. For example, a microlens array may be adhered to the light guide panel 108 to aid the optical coupling with an illuminator 110.

The one or more illuminators 110 and other components may be arranged within a chassis 114 or exterior case. Within the chassis 114 are one or more light sensors 116. The one or more light sensors 116 are coupled to the light guide panel 108. The one or more light sensors 116 are configured to detect a flux of incident photons, such as those directed by the light guide panel 108, and provide a signal indicative of that flux. The incident photons may comprise photons in infrared, visible, or ultraviolet wavelengths, or a combination thereof. The light sensor 116 may comprise a photocell, a phototransistor, a photoresistor, photodiodes, reverse-biased LED, and so forth. In some implementations, at least a portion of the one or more the illuminators 110 may be used as a light sensor. For example, where the illuminator 110 comprises an LED, it may be reverse-biased to generate a signal indicative of incident photons. The light sensor 116 may comprise an analog, digital, or mixed analog-digital device. The one or more light sensors 116 may be configured to detect one or more of visible light, infrared, or ultraviolet. In some implementations, different types of light sensors 116 may be used on the same device 104. For example, one light sensor 116 sensitive to near infrared may be used as well as another light sensor 116 sensitive to visible light.

The positioning and placement of the one or more illuminators 110 and the one or more light sensors 116 are described below in more detail with regard to FIGS. 2-6. The illuminators 110 and the light sensors 116 may be arranged adjacent to one another and the light guide panel 108 within the chassis 114 and optically coupled such that light may be transferred between. In one implementation, the illuminators 110 and the light sensors 116 may be coupled to an edge of the light guide panel 108.

An illumination control module 118 may be coupled to the one or more illuminators 110 and the light sensor 116. The illumination control module 118 may comprise an ambient light module 120 and an illuminator drive module 122. The ambient light module 120 is configured to receive one or more signals from the one or more light sensors 116 and determine an ambient light level. This ambient light level may comprise a flux of photons with infrared wavelengths, visible wavelengths, ultraviolet wavelengths, or a combination thereof. The illuminator drive module 122 is configured to drive the one or more illuminators 110, such as activating them to emit light when in an active state or deactivating them to cease emitting light when in an inactive state. As described above, the one or more illuminators 110 may emit photons with infrared wavelengths, visible wavelengths, ultraviolet wavelengths, or a combination thereof. The illuminator drive module 122 may be configured to provide variable illumination intensity with the one or more illuminators 110. This variation in illumination may be provided to improve user experience, to reduce power consumption, and so forth. In some implementations, such as where the one or more illuminators 110 comprise LEDs, the illuminator drive module 122 may be configured to drive the LEDs with a pulse-width modulated signal.

The illumination control module 118 may be configured with a minimum ambient light threshold, below which illumination is provided by the one or more illuminators 110. Similarly, a maximum ambient light threshold may be configured, above which illumination is discontinued. For example, a pre-determined level of illumination may be provided in a dark room where the ambient light level is below the minimum ambient light threshold. The illumination intensity may increase as the ambient light level increases, until the ambient light level reaches the maximum ambient light threshold when the illumination is discontinued.

In some implementations, the ambient light module 120 may be configured to determine characteristics about the ambient light, such as color temperature. For example, the ambient light module 120 may receive data from the one or more light sensors 116 and determine a source of ambient illumination such as sunlight, fluorescent bulbs, incandescent bulbs, LEDs, and so forth. This determination may then be used to alter illumination. The determination of the source of ambient illumination may be provided to a display driver module to allow for adjustment of a presented image in response thereto, and so forth. For example, under a source of ambient light, which has a higher color temperature and thus appears more blue, the colors on a color display may be adjusted to maintain a desired output. Likewise, the illuminator drive module 122 may be configured to modify the light emitted by the one or more illuminators 110 to compensate at least in part for the source of ambient light.

In some implementations, the illumination control module 118 may also be coupled to a display drive module configured to drive the display panel 106. These couplings may be electrical, such as provided by wires or conductive traces on a circuit board, cable, and so forth. The illumination control module 118 is configured to control the operation of the one or more illuminators 110 based at least in part on input from the light sensor 116. The illumination control module 118 may also be configured to vary illumination based at least in part on an image presented on the display panel 106. For example, where the image presented is mostly light colors such as a blank page sparsely filled with black text, the illumination may be set to a lower level than when the image presented is mostly dark colors such as a grayscale photograph.

In one implementation, changes to the ambient light level may be used to effect changes in the operation of the display panel 106, and vice versa. For example, in low light conditions, the illuminators 110 may be set to increase the intensity of illumination while the display panel 106 may be configured to change contrast settings.

In another implementation, the illuminators 110 and the illumination control module 118 may be omitted. In this implementation, the light guide panel 108 may be configured to direct at least a portion of the incident light to the light sensor 116. As above, changes to the ambient light level may be used to effect changes in the operation of the display panel 106, and vice versa. For example, presentation of information on the display panel 106 may be modified based at least in part on different light levels.

The modules described herein may comprise analog, digital, or mixed analog and digital circuitry. In one implementation, one or more processors may be used to provide the functions described herein.

Figure 2:
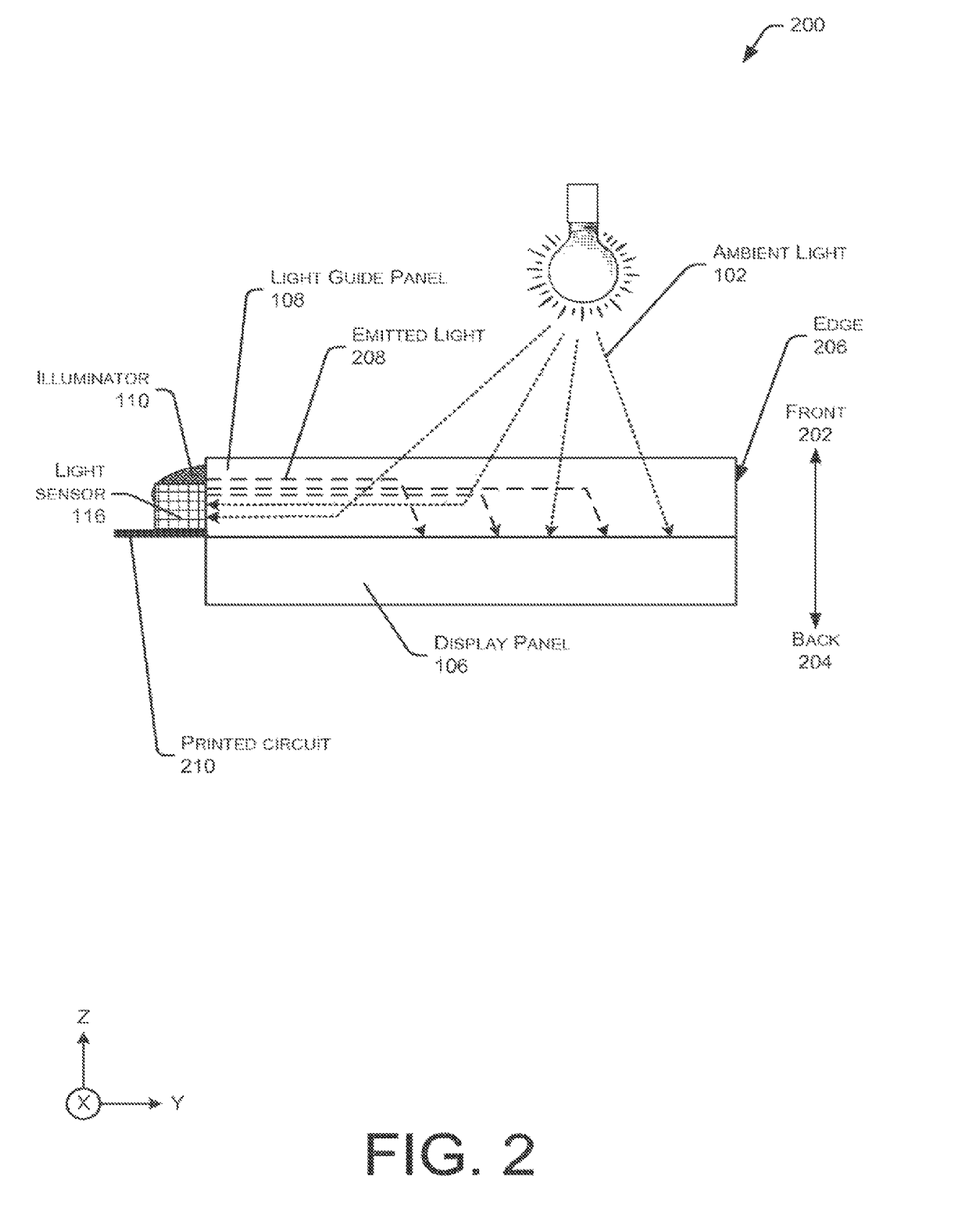
FIG. 2 illustrates a cross sectional view (not to scale) along line "C" of one implementation of the device of FIG. 1 in which the illuminators and the light sensor are on a same edge of the light guide panel in accordance with an embodiment of the disclosure.

FIG. 2 illustrates a cross sectional view 200 along line "C" of one implementation of the device of FIG. 1, in which the illuminators and the light sensor are on a same edge of the light guide panel. In this cross section, a front 202 and a back 204 relative to the device 104 is indicated along the Z axis. As described above, for clarity of illustration, the figures in this disclosure are not depicted to scale. For example, the light guide panel 108 and the display panel 106 may be shorter along the Z axis than the illuminators 110, the light sensor 116, and so forth.

In this view, the ambient light 102 is depicted as impinging on the light guide panel 108 which is in front of the display panel 106. Around the perimeter 112 of the light guide panel 108 are one or more edges 206. These edges 206 are depicted here as being planar and generally perpendicular to the plane of the light guide panel 108. However, in other implementations, the edges 206 may be concave, convex, tapered, or have other shapes.

The illuminator 110 is shown optically coupled to one of the edges 206 of the light guide panel 108. In one implementation, the illuminator 110 may comprise a side-firing light emitting diode, with an emission side abutting the edge 206. The light guide panel 108 is configured to distribute at least a portion of emitted light 208 (with illustrative rays shown here with dashed lines) from the one or more illuminators 110 to the front side of the display panel 106. This distribution of emitted light 208 serves to frontlight or illuminate the display panel 106 and the image presented thereon.

The light sensor 116 is also shown optically coupled to the light guide panel 108 such that at least a portion of ambient light 102 (with rays shown here with dotted lines) incident upon the light guide panel 108 is directed to the one or more light sensors 116. In some implementations the light sensor 116 may comprise a diffusive material, such as a milky or translucent material, in the optical path.

In this illustration, the light sensor 116 is proximate to the one or more illuminators 110 on the same edge 206 of the light guide panel 108. Interaction between the ambient light 102 and the emitted light 208 while propagating within the light guide panel 108 is minimal, such that the rays do not interfere with one another to a substantial degree.

The optical coupling between the light guide panel 108 and the one or more light sensors 116 may comprise one or more of physical proximity, an air gap, an adhesive, a mechanical interface, and so forth. In some implementations, one or more surface features may be provided on the light guide panel 108, the illuminator 110, or both. These surface features, such as diffusers, grooves, grating, dimples, lenses, planar surfaces, concave surfaces, convex surfaces, and so forth, may be used to enhance or attenuate the transmission of light between the one or more illuminators 110 and the light guide panel 108. Examples of these features are described below with regard to FIGS. 3-6. In some implementations, these surface features may be separate or discrete elements which have been coupled to the light guide panel 108. For example, a microlens array may be adhered to the light guide panel 108 to aid the optical coupling with an illuminator 110.

In some implementations, optical features may be internal to the light guide panel 108 instead of, or in addition to, surface features. For example, regions with materials of differing indices of refraction may be used to form internal features to direct light within the light guide panel 108 or to interface points such as proximate to the one or more illuminators 110, lights sensors 116, the front of the display panel 106, and so forth.

The illuminator 110, the light sensor 116, or both, may be affixed to a printed circuit 210. This printed circuit 210 may comprise flexible materials including, but not limited to, flexible printed circuits comprising a plastic and metallic laminate, polyimide, polyether ether ketone, and so forth. In some implementations, the printed circuit 210 may be rigid or semi-rigid, or a combination of flexible, rigid, and semi-rigid materials.

Figure 3:
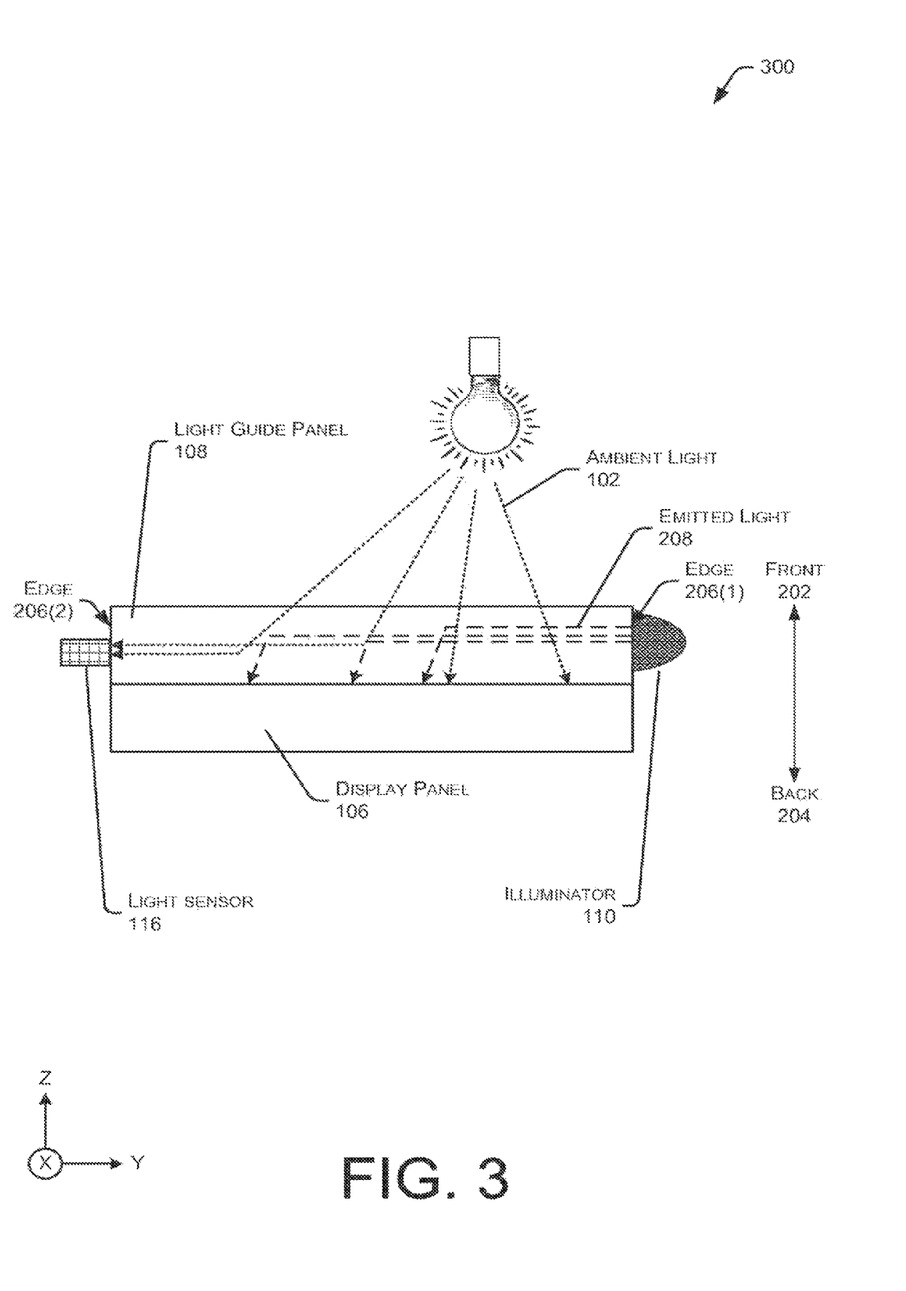
FIG. 3 illustrates a cross sectional view (not to scale) along line "C" of one implementation of the device of FIG. 1 in which the illuminators and the light sensor are on different edges of the light guide panel in accordance with an embodiment of the disclosure.

FIG. 3 illustrates a cross sectional view 300 along line "C" of another implementation of the device of FIG. 1. In this implementation, the illuminator 110 and the light sensor 116 are arranged on opposing edges 206(1) and 206(2) of the light guide panel 108. For example, the light guide panel 108 may be configured to provide a gradient with respect to distribution or diffusion of light therein. This gradient may vary along the Y axis indicated here such that a portion of the light guide panel 108 proximate to the illuminator 110 at edge 206(1) directs less light onto the display panel 106 than a portion of the light guide panel 108 proximate to the light sensor 116 on the opposite edge 206(2). Such a gradient may be configured to allow for a uniform distribution of light provided by the one or more illuminators 110 along the surface of the display panel 106.

In other implementations, the light sensor 116 and the illuminator 110 may be arranged on edges 206 which are at right angles to one another. For example, the one or more illuminators 110 may be on the edge 206 which extends parallel to the Y axis while the one or more light sensors 116 are coupled to the edge 206 which extends parallel to the X axis.

Figure 4:
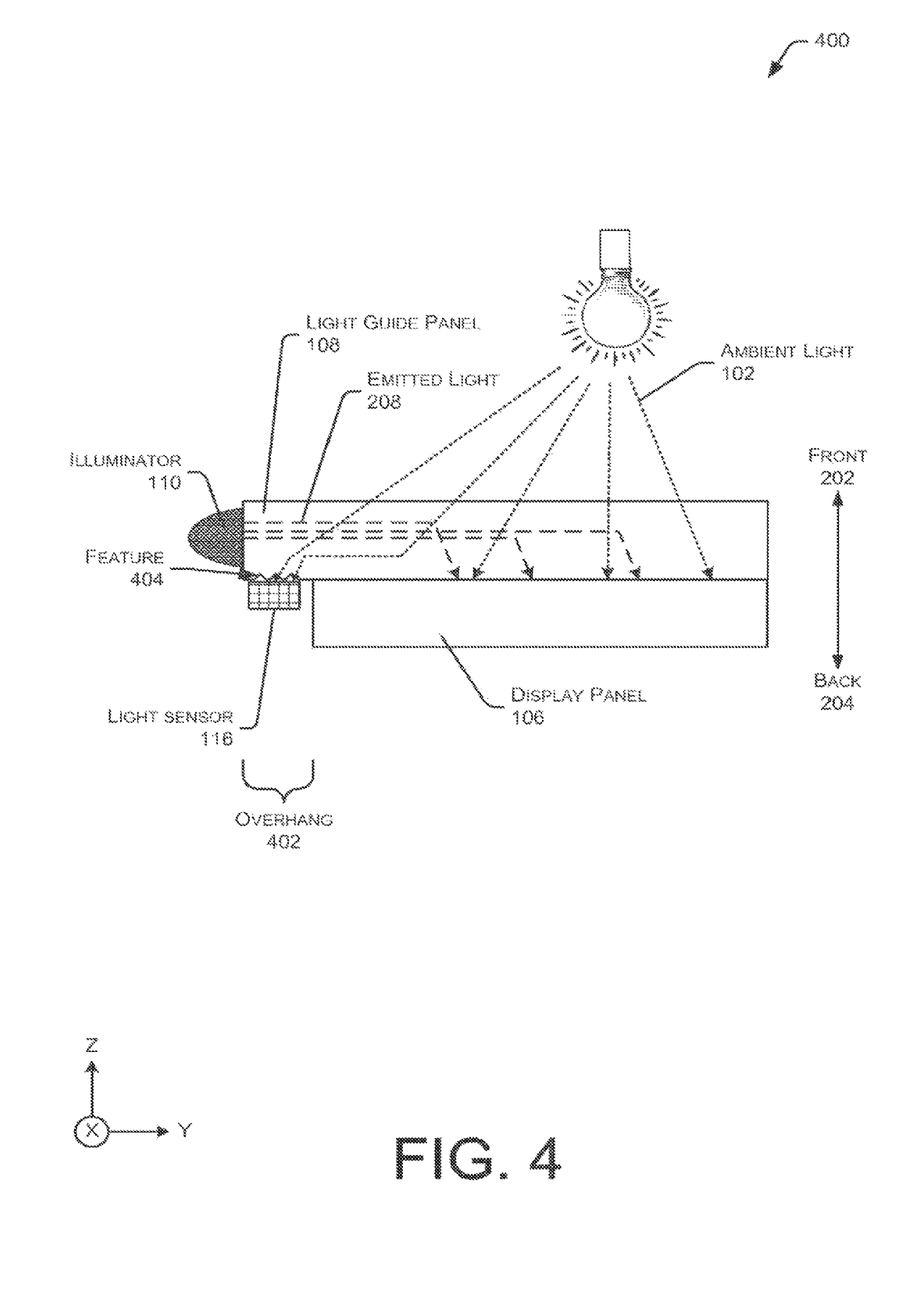
FIG. 4 illustrates a cross sectional view (not to scale) along line "C" of one implementation of the device of FIG. 1 in which the illuminators are on one edge of the light guide panel and the light sensor is under the light guide panel in accordance with an embodiment of the disclosure.

FIG. 4 illustrates a cross sectional view 400 along line "C" of yet another implementation of the device of FIG. 1. As noted above with regard to FIGS. 2 and 3, the one or more illuminators 110 are arranged to optically couple with an edge 206 of the light guide panel 108. In the implementation shown here, at least a portion of the light guide panel 108 may overhang 402 or extend beyond the display panel 106. In this configuration, the light sensor 116 may be arranged to couple to at least a portion of the back 204 of the light guide panel 108. In some implementations, a notch may be provided in the display panel 106 within which at least a portion of the light sensor 116 may be contained.

In another implementation, the one or more light sensors 116 may be configured to couple to the front 202 of the light guide panel 108 in a fashion similar to that described above. In this implementation, the chassis 114 may be configured to enclose the one or more light sensors 116.

One or more surface features 404 on the light guide panel 108 may be provided at an interface of the optical coupling between the light guide panel 108 and the one or more light sensors 116. The surface features 404 may provide for light out-coupling points or light in-coupling points. Light out-coupling points are designed to allow light to be passed from the light guide panel 108 to the light sensor 116. Light in-coupling points are designed to allow light to be passed from the one or more illuminators 110 to the light guide panel 108. In some implementations, a light in-coupling point and a light out-coupling point may be combined into a common structure.

These surface features 404 may comprise one or more of a diffuser, groove, grating, dimple, lens, planar surface, concave surface, or convex surface. For example, as shown here, the feature 404 comprises a feature inset into the light guide panel 108. The surface features 404 may be embossed, impressed, etched, and so forth. The surface features 404 may be separate or discrete elements which have been coupled to the light guide panel 108. In this illustration, the surface feature 404 comprises a grating embossed, etched, or otherwise formed on the back side of the light guide panel 108 in the overhang 402. The ambient light 102 which impinges on at least a portion of the light guide panel 108 is distributed by way of the feature 404 into the light sensor 116.

Figure 5:
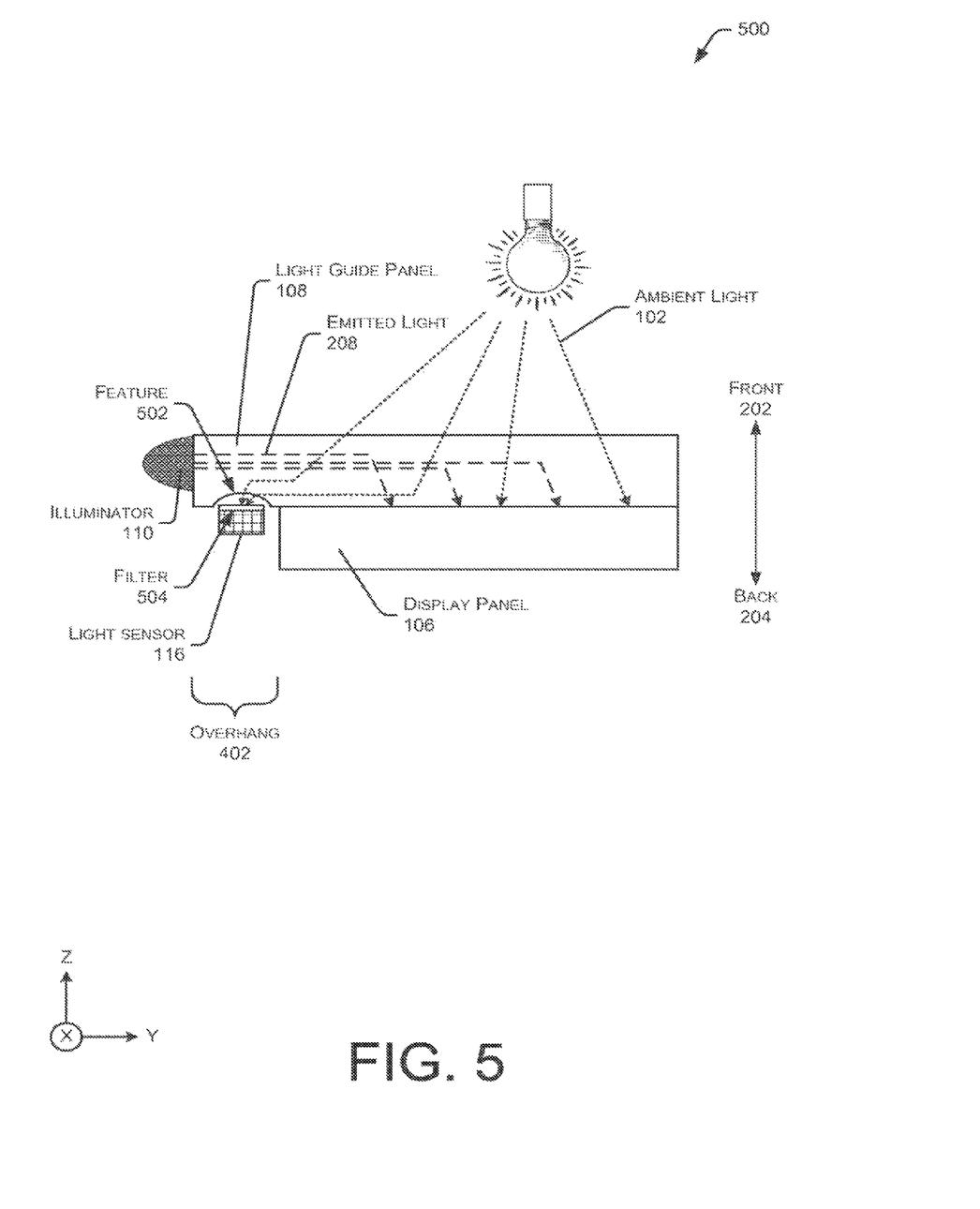
FIG. 5 illustrates a cross sectional view (not to scale) along line "C" of another implementation of the device of FIG. 1 in which the illuminators are on one edge of the light guide panel and the light sensor is under the light guide panel in accordance with an embodiment of the disclosure.

FIG. 5 illustrates a cross sectional view 500 along line "C" of another implementation of the device of FIG. 1. In this implementation, the illuminator 110 is arranged on an edge 206 while the light sensor 116 is arranged under the overhang 402 provided where the light guide panel 108 extends beyond the perimeter 112 of the display panel 106. In this example, a feature 502 comprising a concavity is depicted. As above, this feature 502 may be configured to direct at least a portion of the incident light as part of the optical coupling between the one or more light sensors 116 and the light guide panel 108. In some implementations, the feature 502 may be configured such that the light sensor 116 may be recessed into a portion of the light guide panel 108.

In some implementations a light filter 504 may arranged between the light guide panel 108 and the one or more light sensors 116. This light filter 504 may be configured to filter out light generated by the one or more illuminators 110. For example, where the one or more illuminators 110 are configured to generate light with a wavelength shorter than 850 nanometers (nm), the light filter 504 may comprise a low pass filter configured to pass light with longer wavelengths while attenuating higher wavelengths. As a result, the light generated by the one or more illuminators 110 is attenuated, which may provide for improved measurement of the ambient light 102. The light filter 504 may be integrated into the light sensor 116, the light guide panel 108, a combination thereof, or comprise a discrete component disposed between the two.

Figure 6:
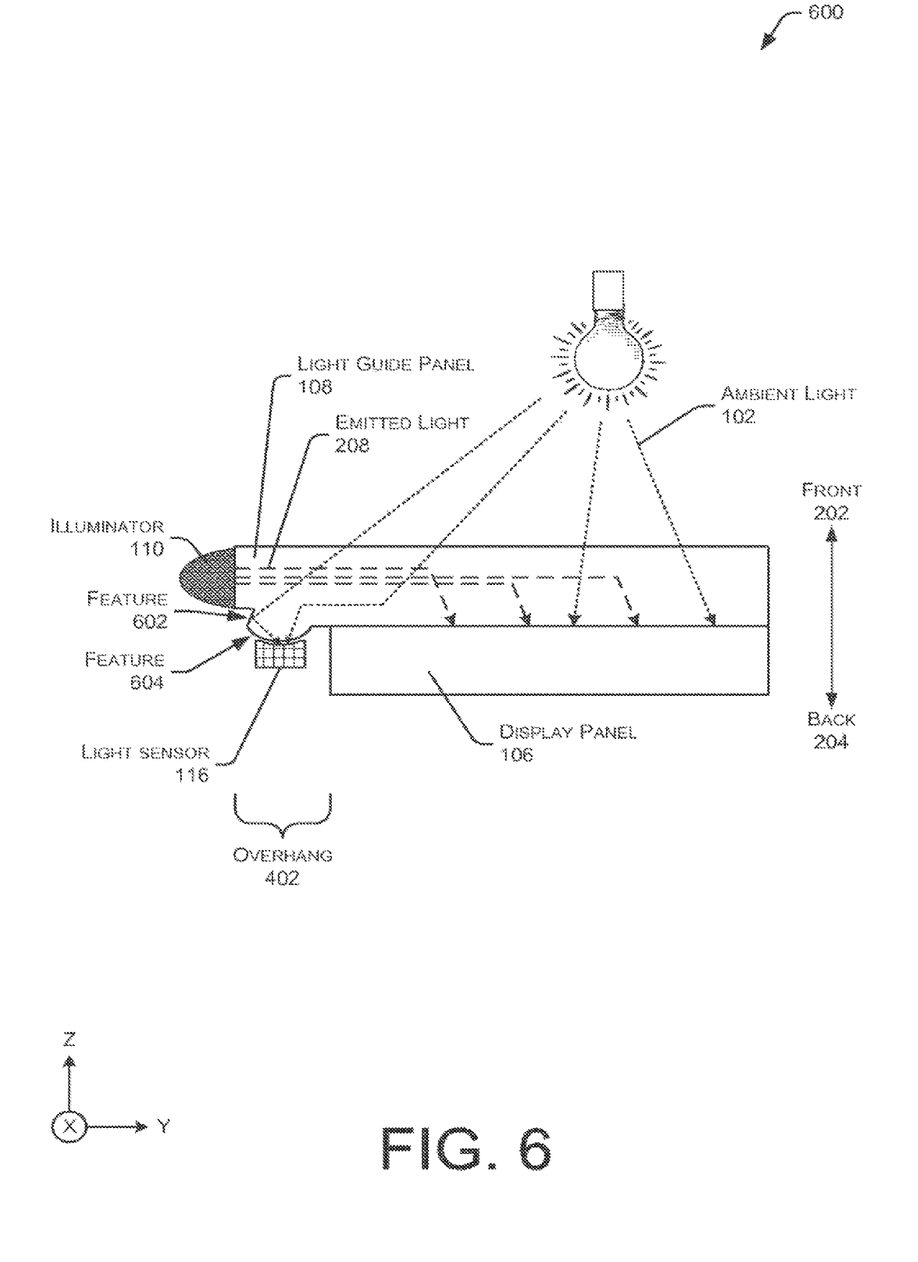
FIG. 6 illustrates a cross sectional view (not to scale) along line "C" of another implementation of the device of FIG. 1 in which the illuminators are on one edge of the light guide panel and the light sensor is under the light guide panel in accordance with an embodiment of the disclosure.

FIG. 6 illustrates a cross sectional view 600 along line "C" of yet another implementation of the device of FIG. 1 in which the one or more illuminators 110 are on one edge of the light guide panel, and the light sensor 116 is under the overhang 402 of the light guide panel 108. In this example, the optical coupling between the light sensor 116 and the light guide panel 108 is facilitated by a planar feature 602 and a convex feature 602. In some implementations, one or more features or portions thereof may be configured to act as mirrors. For example, the exterior of the feature 602 may be coated with a reflective material such as aluminum to form a mirror which directs at least a portion of the ambient light 102 into the light sensor 116.

Figure 7:
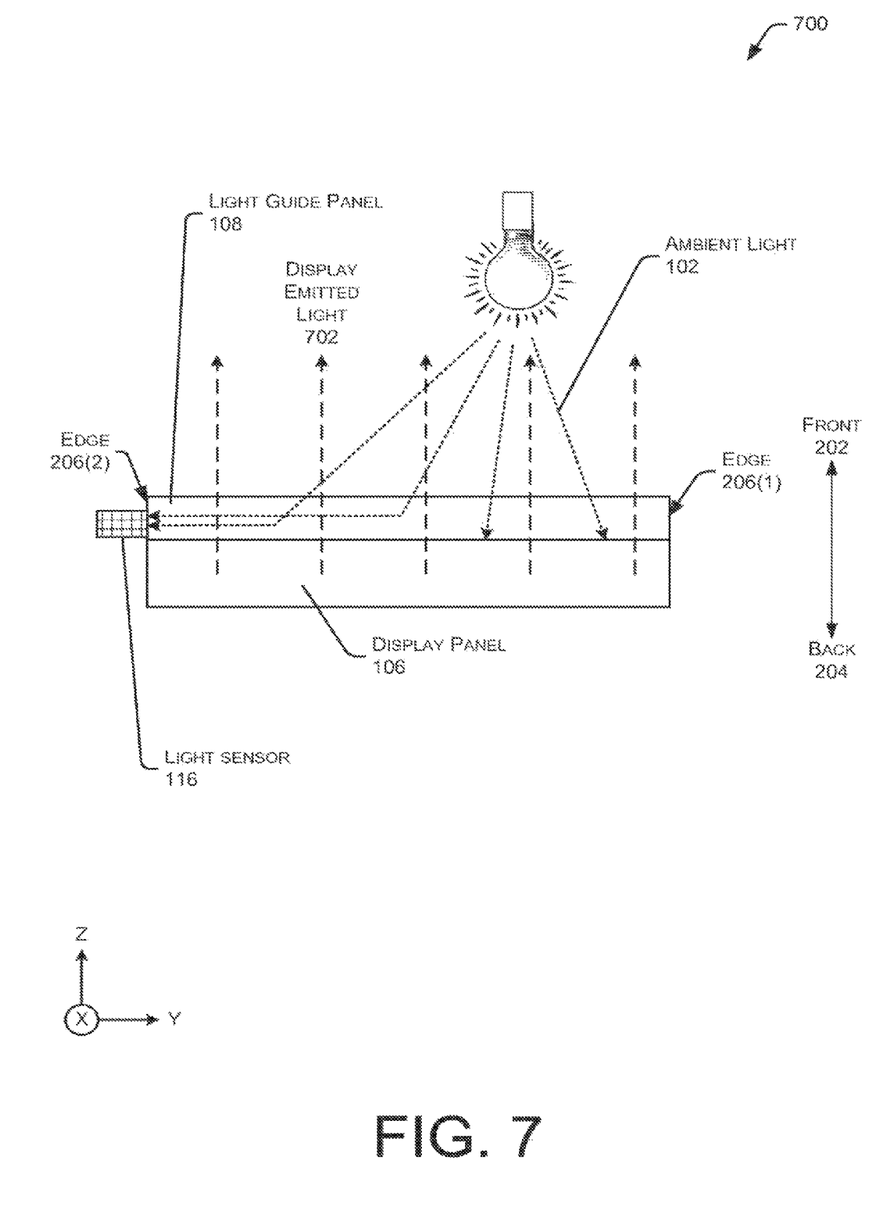
FIG. 7 illustrates a cross sectional view (not to scale) along line "C" of another implementation of the device of FIG. 1 comprising an emissive display and a light guide coupled to the light sensor in accordance with an embodiment of the disclosure.

FIG. 7 illustrates a cross sectional view 700 (not to scale) along line "C" of another implementation of the device of FIG. 1. In this implementation the display panel 106 comprises an emissive display, such as a backlit LCD display, LED display, and so forth. During presentation of an image, the emissive display is configured to generate display emitted light 702. In this implementation, the light sensor 116 is arranged on an edge 206(2) of the light guide panel 108. The light guide panel 108 may be configured to direct or distribute at least a portion of the ambient light 102 to the light sensor 116. In another implementation, a reflective display may be used without a front light, and the light guide panel 108 may be configured to direct or distribute at least a portion of the ambient light 102 to the light sensor 116.

Figure 8:
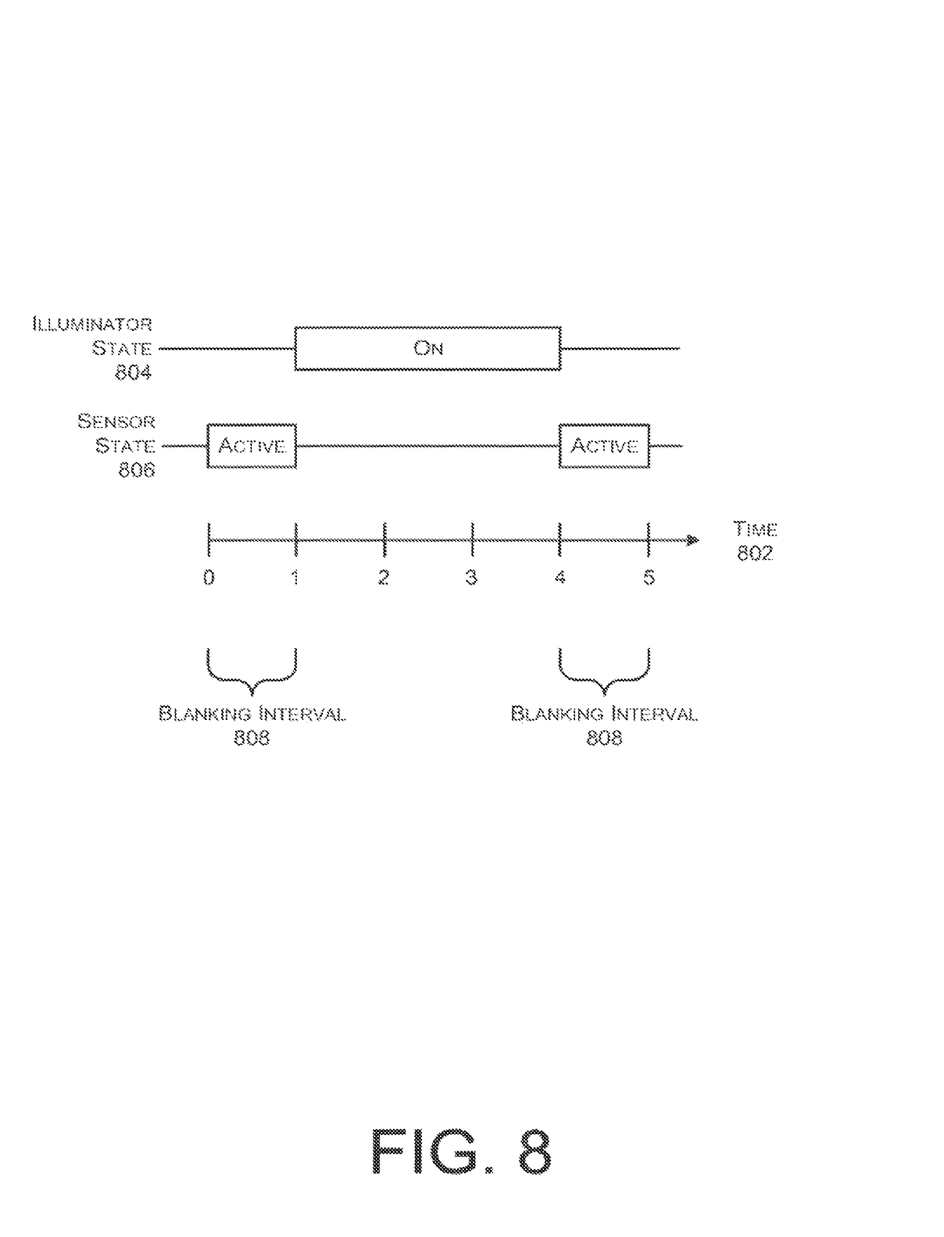
FIG. 8 illustrates a timeline of states of the illuminators and light sensor over time in accordance with an embodiment of the disclosure.

FIG. 8 illustrates a timeline 800 of states of the one or more illuminators 110 and the one or more light sensors 116. In this illustration, time 802 increases from left to right along a horizontal axis. The time intervals may vary depending at least in part on the switching characteristics of the one or more illuminators 110, the one or more light sensors 116, or other factors. In some implementations, the time intervals depicted here may be about one millisecond.

An illuminator state 804, which shows when the one or more illuminators 110 are active, is shown. The illuminator state 804 may be determined by the operation of the illuminator drive module 122. Also shown is a sensor state 806, indicating times when data from the one or more light sensors 116 is used for measurement. The sensor state 806 may be determined by the operation of the illuminator drive module 122.

In some implementations, at least a portion of the one or more light sensors 116 may be turned on or off, such as with a transistor, field-effect transistor ("FET"), and so forth. This may be done to control generation of data from the light sensor 116, to reduce power consumption, and so forth. In other implementations, the one or more light sensors 116 may remain powered, but sensor data is used or accessed by the ambient light module 120 during the time intervals designated here as "active."

In this timeline 800, the one or more illuminators 110 are configured to be inactive during sensing of the ambient light state by the one or more light sensors 116, producing a blanking interval 808. For example, as shown here, from time 0 to 1, the sensor state is "active" indicating that the one or more light sensors 116 are providing data about ambient light which is being used by the ambient light module 120. From time 1 to 4, the light sensors 116 are inactive while the illuminator state 804 is on. From time 4 to 5, another blanking interval 808 is produced by the illuminators 110 being off while the sensor state 806 is set to an active state again to sense ambient light. For example, the illumination control module 118 may deactivate the one or more illuminators during the blanking interval 808. Ambient light sensing during the blanking interval 808 allows for sampling of the ambient light 102 free from possible interference generated by the emitted light 208. This blanking interval 808 may vary, but in one implementation may be about 15 milliseconds (ms) or less. The blanking interval 808 may be of a fixed or adjustable length.

In some implementations, the blanking interval 808 may be configured to correspond to an event occurring on the device 104. For example, during a page turn on an e-Book reader device, a blanking interval 808 may be produced where the illuminator state 804 is off and the sensor state 806 is active as the display panel 106 is being redrawn.

In some implementations the active sensor state 806 may be coordinated to take place during a particular part of the refresh or the redraw of the display panel 106. For example, during a "flash" of an EPD, the screen may momentarily present all white and then momentarily all black pixels. The presence of these all white or all black pixels, or a combination thereof, may affect the flux of ambient light 102 directed to the one or more light sensors 116. As a result, the display driver module may be configured to exchange one or more signals with the illumination control module 118 such that the blanking interval 808 and corresponding active sensor state 806 are coordinated to occur contemporaneously.

The duration during which the one or more illuminators 110 and the one or more light sensors 116 are active is shown here for illustrative purposes. For example, the active illuminator state 804 and the active light sensor state 806 may have substantially equal time, or be configured such that the light sensors 116 are active more than the one or more illuminators 110.

Figure 9:
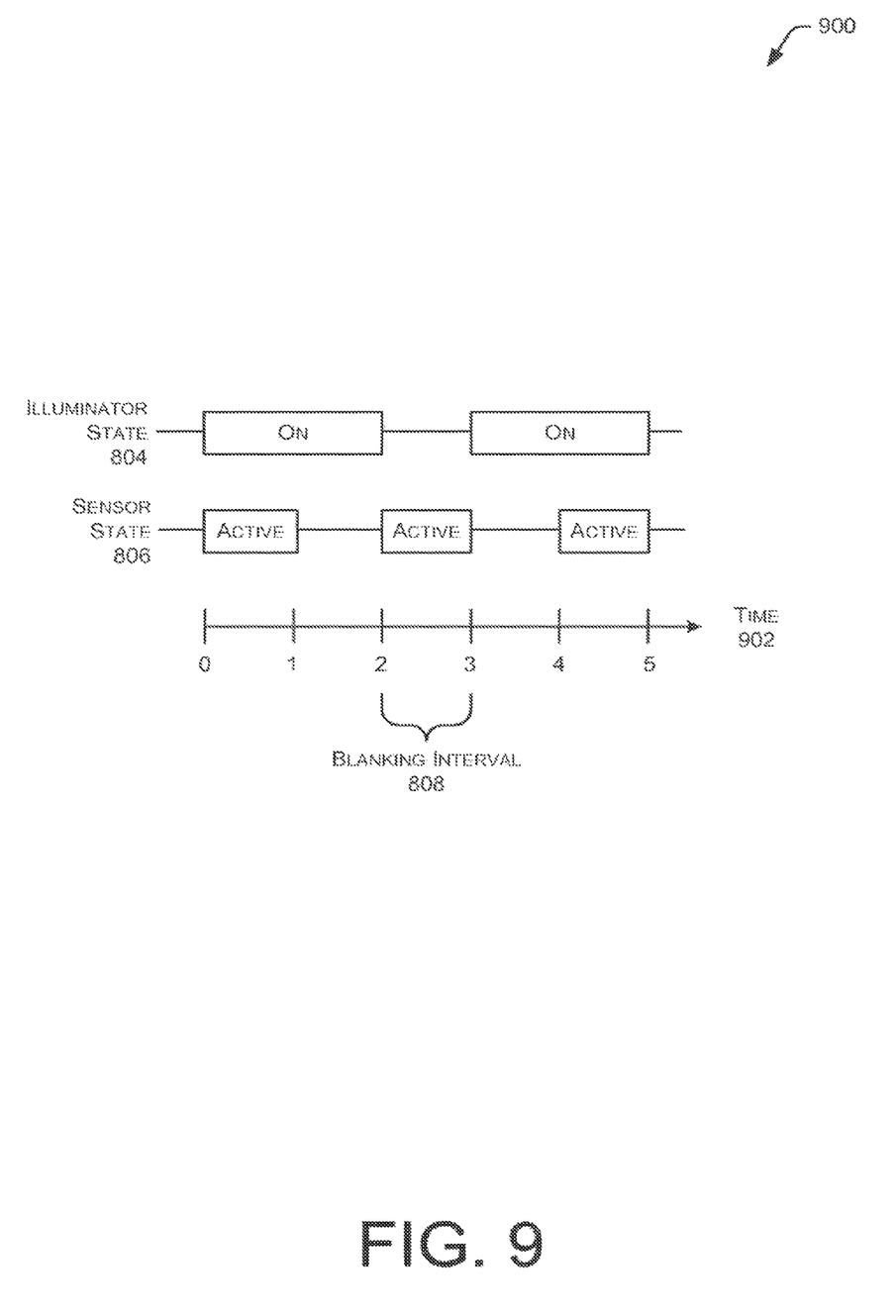
FIG. 9 illustrates a timeline of states of the illuminators and light sensor over time in accordance with an embodiment of the disclosure.

FIG. 9 illustrates a timeline 900 of states of the one or more illuminators and one or more light sensors. In this illustration, time 902 increases from left to right along a horizontal axis. The illuminator state 804 and the sensor state 806 are also depicted, as described above with regard to FIG. 8.

The one or more illuminators 110 may be configured to be active while the one or more light sensors 116 are measuring ambient light 102. From time 0 to 2, the illuminator state 804 is set to on. During time 0 to 1 the sensor state 806 is set to active. During time 1 to 2, the sensor state 806 is inactive while the illuminator state 804 remains on. During interval 2 to 3, the sensor state 806 is active, while the illuminator state 804 is off, forming a blanking interval 808. This combination of sensing while the illuminator state 804 is on and off allows for sampling of the ambient light 102 in the presence of the emitted light 208 and also when free from possible interference generated by the emitted light 208.

The illuminator state 804 and the sensor state 806 may be synchronized or unsynchronized with one another. During synchronized operation, a common clock may provide timing signals for the ambient light module 120 and the illuminator drive module 122. During unsynchronized operation, the ambient light module 120 and the illuminator drive module 122 may not be members of the same clock tree, and thus may be considered free running relative to one another.

Illustrative Processes

Figure 10:
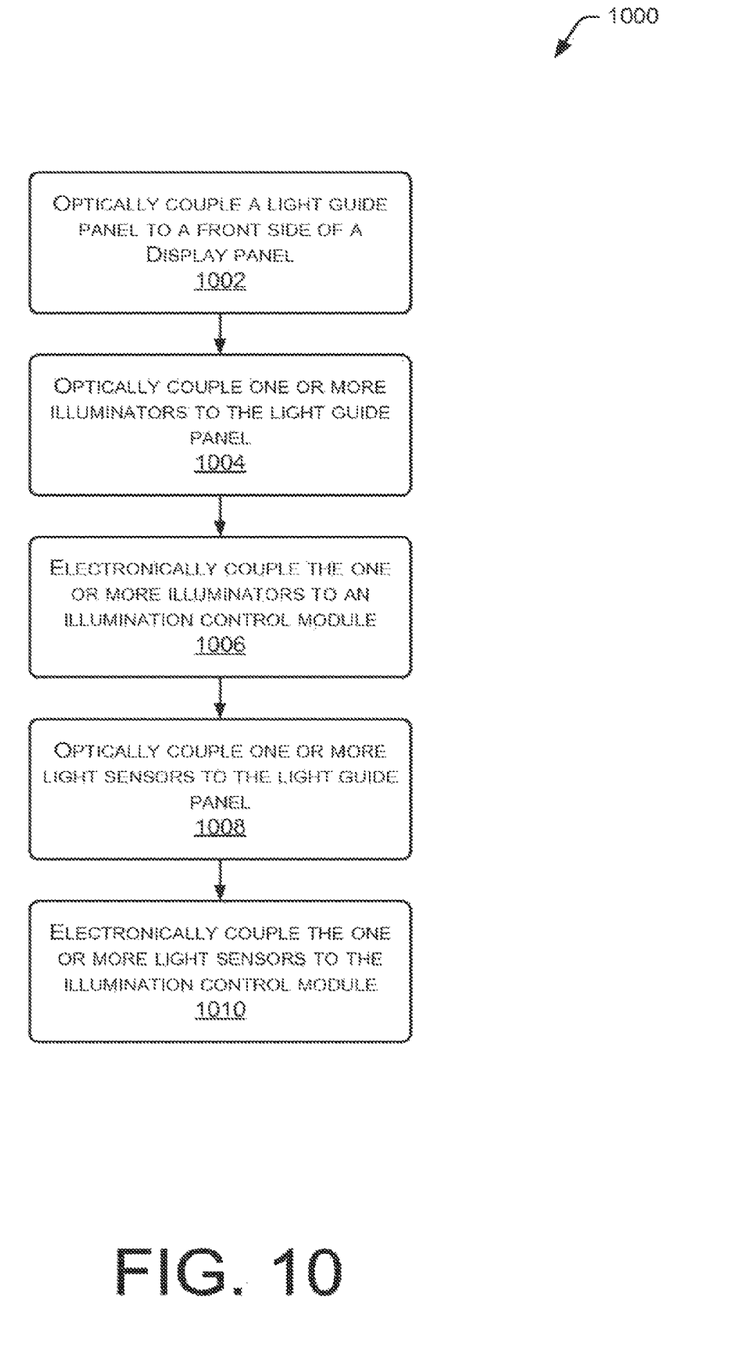
FIG. 10 illustrates a flow diagram of a process of manufacturing the device in accordance with an embodiment of the disclosure.

FIG. 10 illustrates a flow diagram 1000 of a process of manufacturing the device 104. The following operations may be performed by manual, automated, or combined automated and manual means.

At 1002, the light guide panel 108 is optically coupled to the front side of a display panel 106. For example, the light guide panel 108 may be laminated to the display panel 106 using one or more of heat, pressure, or adhesive.

At 1004, the one or more illuminators 110 are optically coupled to the light guide panel 108. For example, the one or more illuminators 110 may be placed proximate to pre-determined light in-coupling points on the edge 206 of the light guide panel 108. The optical coupling may involve establishing a mechanical alignment between one or more features on the light guide panel 108 and the one or more illuminators 110. As described above, the one or more illuminators 110 may be configured to generate photons in infrared wavelengths, visible wavelengths, ultraviolet wavelengths, or a combination thereof.

At 1006, the one or more illuminators 110 are electronically coupled to the illumination control module 118. In one implementation, the one or more illuminators 110 and the illumination control module 118 may be placed on the printed circuit 210 and coupled to conductive pathways thereon thus providing an electronic coupling between the components.

At 1008, the one or more light sensors 116 are optically coupled to the light guide panel 108. For example, the one or more illuminators 110 may be placed proximate to pre-determined light out-coupling points on the edge 206 of the light guide panel 108. The optical coupling may involve establishing a mechanical alignment between one or more features on the light guide panel 108 and the one or more light sensors 116. As described above, the one or more light sensors 116 may be configured to detect photons in infrared wavelengths, visible wavelengths, ultraviolet wavelengths, or a combination thereof.

At 1010, the one or more light sensors 116 are electronically coupled to the illumination control module 118. As described above, the one or more light sensors 116 may be emplaced on the printed circuit 210 and coupled to the conductive pathways thereon to provide the electronic coupling.

Figure 11:
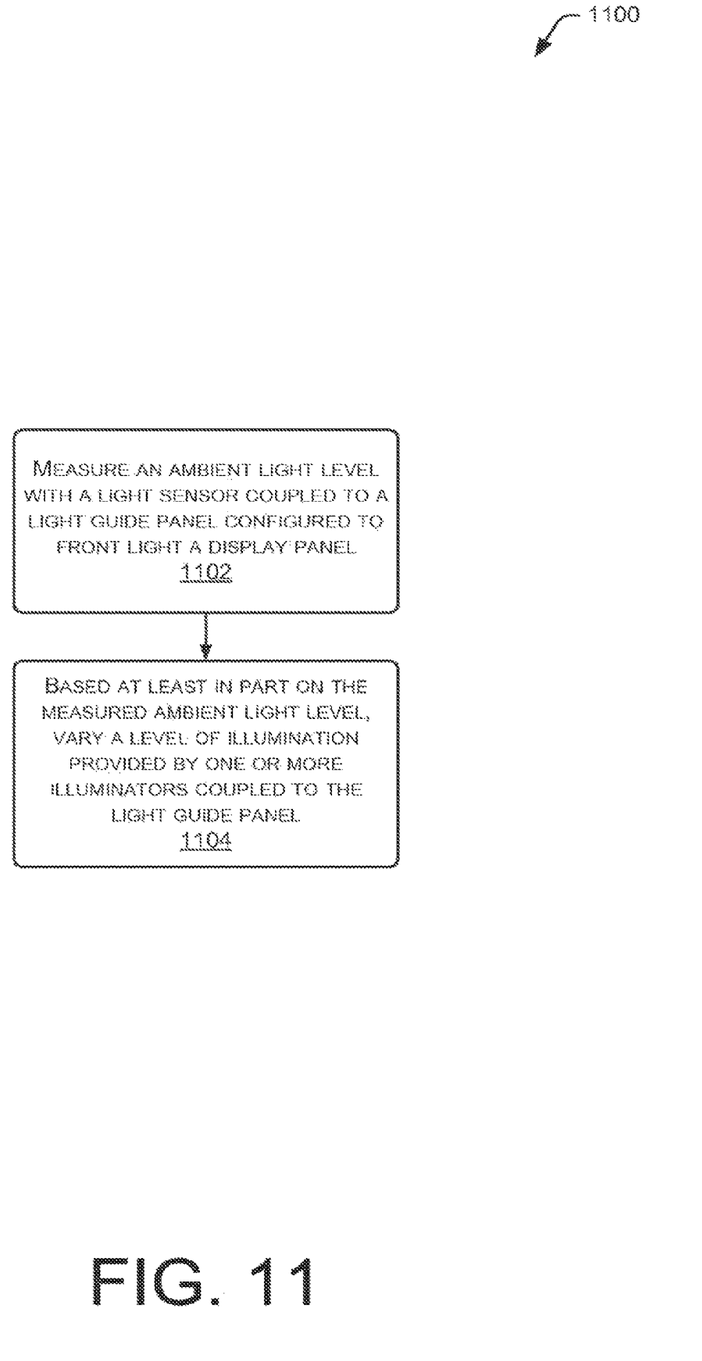
FIG. 11 illustrates a flow diagram of a process of varying illumination of the device at least partly in response to an ambient light level measured by the ambient light sensor in accordance with an embodiment of the disclosure.

FIG. 11 illustrates a flow diagram 1100 of a process of varying illumination of the device 104 at least partly in response to an ambient light level measured by the ambient light sensor. This process may be implemented by the illumination control module 118.

At 1102, an ambient light level is measured with one or more light sensors 116 coupled to the light guide panel 108. This light guide panel 108 may be configured to provide frontlighting to a display panel 106. In some implementations, the light guide panel 108 may comprise at least a portion of the chassis 114. As described above, the ambient light level may be measured while one or more illuminators 110 are active or inactive. The ambient light level may be measured continuously, or at intervals as determined by the ambient light module 120. The ambient light level may be measured in infrared wavelengths, visible wavelengths, ultraviolet wavelengths, or a combination thereof.

At 1104, based at least in part on the measured ambient light level, a level of illumination provided by the one or more illuminators 110 coupled to the light guide panel 108 may be varied by the illuminator drive module 122. For example, when the measured ambient light level is below a pre-determined minimum ambient light level threshold, the one or more illuminators 110 or a portion thereof may be activated to provide additional illumination to the display. Similarly, when the ambient light level is above a maximum pre-determined threshold, the one or more illuminators 110 may be deactivated to prevent over illumination, to reduce power consumption, and so forth. As described above, the illumination may be provided in infrared wavelengths, visible wavelengths, ultraviolet wavelengths, or a combination thereof.

CONCLUSION

The processes described and shown above may be carried out or performed in any suitable order as desired in various implementations. Additionally, in certain implementations, at least a portion of the processes may be carried out in parallel. Furthermore, in certain implementations, less than or more than the processes described may be performed.

Certain aspects of the disclosure are described above with reference to flow diagrams of methods, apparatuses, or computer program products according to various implementations. It will be understood that one or more blocks of the flow diagrams, and combinations of blocks in the flow diagrams, can be implemented by computer-executable program instructions. Likewise, some blocks of the flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the flow diagrams support combinations of means for performing the specified functions, combinations of elements or steps for performing the specified functions and program instruction means for performing the specified functions. It will also be understood that each block of the flow diagrams, and combinations of blocks in the flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

What is claimed is:

1. A system comprising:
   one or more processors; and
   non-transitory computer readable medium comprising program instructions stored thereon that are executable by the one or more processors to cause the system to:
   receive, from one or more light sensors, one or more signals indicative of a level of ambient light, the one or more light sensors being coupled to a light guide panel such that at least a portion of ambient light incident upon the light guide panel is directed to the one or more light sensors, wherein the one or more signals indicative of the level of ambient light are received while at least some of a plurality of illuminators are activated and at least some of the plurality of illuminators are deactivated;
determine an ambient light level using the one or more signals; and
vary a level of illumination provided by the plurality of illuminators using the determined ambient light level, wherein the plurality of illuminators provide illuminating light that is distributed via the light guide panel to illuminate a display.

2. The system of claim 1, the program instructions further executable to cause:
varying a contrast of the display using the determined ambient light level.

3. The system of claim 1, wherein the display comprises a front-lit electrophoretic display panel.

4. The system of claim 1, wherein the display comprises a back-lit liquid crystal display panel.

5. The system of claim 1, wherein the display comprises a display panel having a front side for presenting images, and wherein the light guide panel is optically coupled to:
the front side of the display panel;
the one or more light sensors; and
the plurality of illuminators.

6. A method comprising:
receiving, from one or more light sensors, one or more signals indicative of a level of ambient light, the one or more light sensors being coupled to a light guide panel such that at least a portion of ambient light incident upon the light guide panel is directed to the one or more light sensors, wherein the one or more signals are received while at least some of a plurality of illuminators are activated and at least some of the plurality of illuminators are deactivated;
determining an ambient light level using the one or more signals; and
varying a level of illumination provided by the plurality of illuminators using the determined ambient light level, wherein the plurality of illuminators provide illuminating light that is distributed via the light guide panel to illuminate a display.

7. The method of claim 6, further comprising:
receiving an indication that the display is displaying an image; and
activating at least some of the plurality of illuminators.

8. The method of claim 6, further comprising:
determining that the ambient light level is below an ambient light level threshold; and
activating at least some of the plurality of illuminators.

9. The method of claim 6, further comprising:
determining that the ambient light level is above an ambient light level threshold; and
deactivating at least some of the plurality of illuminators.

10. The method of claim 6, further comprising:
determining a source of the ambient light; and
altering an illumination color provided by at least some of the plurality of illuminators.

11. The method of claim 6, further comprising:
varying a contrast of the display using the determined ambient light level.

12. A non-transitory computer readable medium comprising program instruction stored thereon that are executable by one or more processors to cause:
receiving, from one or more light sensors, one or more signals indicative of a level of ambient light, the one or more light sensors being coupled to a light guide panel such that at least a portion of ambient light incident upon the light guide panel is directed to the one or more light sensors, wherein the one or more signals are received while at least some of a plurality of illuminators are activated and at least some of the plurality of illuminators are deactivated;
determining an ambient light level using the one or more signals; and
varying a level of illumination provided by the plurality of illuminators using the determined ambient light level, wherein the plurality of illuminators provide illuminating light that is distributed via the light guide panel to illuminate a display.

13. The non-transitory computer readable medium of claim 12, the program instructions further executable to cause:
receiving an indication that the display is displaying an image; and
activating at least some of the plurality of illuminators.

14. The non-transitory computer readable medium of claim 12, the program instructions further executable to cause:
determining that the ambient light level is below an ambient light level threshold; and
activating at least some of the plurality of illuminators.

15. The non-transitory computer readable medium of claim 12, the program instructions further executable to cause:
determining that the ambient light level is above an ambient light level threshold; and
deactivating at least some of the plurality of illuminators.

16. The non-transitory computer readable medium of claim 12, the program instructions further executable to cause:
determining a source of the ambient light; and
altering an illumination color provided by at least some of the plurality of illuminators.

17. The medium non-transitory computer readable medium of claim 1, the program instructions further executable to cause:
varying a contrast of the display using the determined ambient light level.

* * * * *